(12) United States Patent
Zhang et al.

(10) Patent No.: US 9,860,902 B2
(45) Date of Patent: Jan. 2, 2018

(54) INFORMATION PROCESSING METHOD, USER EQUIPMENT, AND BASE STATION

(71) Applicant: Huawei Technologies Co., Ltd., Shenzhen (CN)

(72) Inventors: Xiangdong Zhang, Beijing (CN); Zheng Yu, Beijing (CN); Brian Classon, Palatine, IL (US)

(73) Assignee: Huawei Technologies Co., Ltd, Shenzhen (CN)

(*) Notice: Subject to any disclaimer, the term of this patent is extended or adjusted under 35 U.S.C. 154(b) by 0 days.

(21) Appl. No.: 15/221,416

(22) Filed: Jul. 27, 2016

(65) Prior Publication Data

US 2016/0338070 A1 Nov. 17, 2016

Related U.S. Application Data

(63) Continuation of application No. PCT/CN2014/071709, filed on Jan. 28, 2014.

(51) Int. Cl.
| | |
|---|---|
| *H04W 72/08* | (2009.01) |
| *H04W 74/08* | (2009.01) |
| *H04W 24/08* | (2009.01) |
| *H04W 74/06* | (2009.01) |
| *H04L 1/08* | (2006.01) |
| *H04W 88/02* | (2009.01) |
| *H04W 88/08* | (2009.01) |

(52) U.S. Cl.
CPC ............ *H04W 72/08* (2013.01); *H04L 1/08* (2013.01); *H04W 24/08* (2013.01); *H04W 74/06* (2013.01); *H04W 74/0833* (2013.01); *H04W 88/02* (2013.01); *H04W 88/08* (2013.01)

(58) Field of Classification Search
CPC .................................................... H04W 72/08
See application file for complete search history.

(56) References Cited

U.S. PATENT DOCUMENTS

| | | | | |
|---|---|---|---|---|
| 2010/0202288 | A1* | 8/2010 | Park | H04W 48/08 370/230 |
| 2011/0299492 | A1* | 12/2011 | Lee | H04W 4/00 370/329 |
| 2015/0009883 | A1 | 1/2015 | Bai et al. | |

FOREIGN PATENT DOCUMENTS

| | | |
|---|---|---|
| CN | 103179670 A | 6/2013 |
| CN | 103298090 A | 9/2013 |
| WO | 2013116131 A1 | 8/2013 |

OTHER PUBLICATIONS

3GPP TR 36.888 V12.0.0 (Jun. 2013); 3rd Generation Partnership Project; Technical Specification Group Radio Access Network; "Study on provision of low-cost Machine-Type Communications (MTC) User Equipments (UEs) based on LTE" (Release 12); 56 pages.

(Continued)

*Primary Examiner* — Michael T Vu
(74) *Attorney, Agent, or Firm* — Slater Matsil, LLP

(57) ABSTRACT

Embodiments provide an information processing method, user equipment, and a base station, where the information processing method includes: obtaining, by user equipment, a coverage enhancement requirement; and communicating, by the user equipment, with a base station according to the coverage enhancement requirement. The user equipment obtains the coverage enhancement requirement and communicates with the base station according to the coverage enhancement requirement.

18 Claims, 5 Drawing Sheets

(56) References Cited

OTHER PUBLICATIONS

3GPP TS 36.212 V10.8.0 (Jun. 2013); 3rd Generation Partnership Project; Technical Specification Group Radio Access Network; "Evolved Universal Terrestrial Radio Access (E-UTRA)"; Multiplexing and channel coding (Release 10); 79 pages.

3GPP TS 36.213 V10.11.0 (Dec. 2013); 3rd Generation Partnership Project; Technical Specification Group Radio Access Network; "Evolved Universal Terrestrial Radio Access (E-UTRA)"; Physical layer procedures (Release 10); 127 pages.

3GPP TS 36.300 V10.11.0 (Sep. 2013); 3rd Generation Partnership Project; Technical Specification Group Radio Access Network; "Evolved Universal Terrestrial Radio Access (E-UTRA) and Evolved Universal Terrestrial Radio Access Network (E-UTRAN)"; Overall description; Stage 2 (Release 10); 195 pages.

3GPP TS 36.321 V10.9.0 (Jun. 2013); 3rd Generation Partnership Project; Technical Specification Group Radio Access Network; "Evolved Universal Terrestrial Radio Access (E-UTRA)"; Medium Access Control (MAC) protocol specification (Release 10); 54 pages.

3GPP TS 36.331 V9.16.0 (Sep. 2013); 3rd Generation Partnership Project; Technical Specification Group Radio Access Network; "Evolved Universal Terrestrial Radio Access (E-UTRA)"; Radio Resource Control (RRC); Protocol specification (Release 9); 262 pages.

SONY; "PDCCH Coverage Extension for Low-Cost MTC UEs by Power-Density Boosting"; 7.2.4.5; R1-130960; 3GPP TSG RAN WG1 #72bis; Chicago, USA; Apr. 15-19, 2013; 8 pages.

ZTE; "Physical Random Access Channel Coverage Enhancement"; 7.2.2.2.2; 3GPP TSG RAN WG1 Meeting #74b; Guangzhou, China, Oct. 7-11, 2013; R1-134303; 16 pages.

CATT; "Discussion on Low Cost MTC Impacts"; 7.9.1; 3GPP TSG RAN WG2 Meeting #85; Prague, Czech Republic; Feb. 10-14, 2014; R2-140072; 4 pages.

Samsung, "PRACH Coverage Enhancements for MTC UEs," 3GPP TSG RAN WG1 #74bis, R1-134163, Guangzhou, China, Oct. 7-11, 2013, 3 pages.

Intel Corporation, "Coverage Enhancement of PRACH for Low Cost MTC," 3GPP TSG RAN WG1 Meeting #75, R1-135104, San Francisco, CA, USA, Nov. 11-15, 2013, 8 pages.

Intel Corporation, "Discussion on PRACH Coverage Enhancement for Low Cost MTC," 3GPP TSG RAN WG1 Meeting #74, R1-132930, Barcelona, Spain, Aug. 19-23, 2013, 7 pages.

Ericsson, "Random Access for Enhanced Coverage MTC UE," 3GPP TSG RAN WG1 Meeting #75, R1-135645, San Francisco, CA, USA, Nov. 11-15, 2013, 4 pages.

\* cited by examiner

INFORMATION PROCESSING METHOD, USER EQUIPMENT, AND BASE STATION

CROSS-REFERENCE TO RELATED APPLICATIONS

This application is a continuation of International Application No. PCT/CN2014/071709, filed on Jan. 28, 2014, which is hereby incorporated by reference in its entirety.

TECHNICAL FIELD

The present invention relates to the communications field, and in particular, to an information processing method, user equipment, and a base station.

BACKGROUND

With the development of science and technology, communications technologies have also rapidly developed, which brings more convenience to people's life.

The Internet of Things is used as an example. The Internet of Things refers to a network in which information about a physical word is acquired by deploying user equipment (UE) with a specific capability of perception, calculation, execution, and communication, a base station sends the information to the network, and then information transmission, coordination, and processing are implemented, thereby implementing interconnections between human beings and things and between things. Therefore, the Internet of Things may be applied to various aspects, such as a smart grid, intelligent agriculture, intelligent traffic, and environment detection, which provides convenience for people's life in various aspects.

Because hardware and software constitutions of user equipments are different from each other, and environments in which the user equipments are located are different from each other, communication statuses in which the user equipments communicate with a base station are also tremendously different. Specifically, communication statuses in which different user equipments communicate with a base station in the same environment may be different, and communication statuses in which a same device communicates with a base station in different environments may also be different.

Currently, to ensure accurate communication between user equipment and a base station, generally, the base station adds an additional communication resource, for example information for transmission is repeatedly transmitted, so as to ensure accuracy of communication between the base station and the user equipment that communicates with the base station. However, when the base station adds the additional communication resource, accuracy of communication between the base station and user equipment whose communication status is poorest when the user equipment communicates with the base station needs to be ensured, but for another user equipment whose communication status is better, the additional communication resource added by the base station causes a waste of resources.

Therefore, a technical problem in the prior art that a waste of resources exists when a base station communicates with user equipment.

SUMMARY

Embodiments provide an information processing method, user equipment, and a base station, so as to resolve a technical problem in the prior art that a waste of resources exists when a base station communicates with user equipment.

According to a first aspect, embodiments provide an information processing method, includes obtaining, by user equipment, a coverage enhancement requirement and communicating, by the user equipment, with a base station, according to the coverage enhancement requirement.

With reference to the first aspect, in a first possible implementation manner, after the obtaining, by user equipment, a coverage enhancement requirement, the method further includes: storing, by the user equipment, the coverage enhancement requirement, so that the user equipment uses the coverage enhancement requirement in a next random access process.

With reference to the first aspect, in a second possible implementation manner, after the obtaining, by user equipment, a coverage enhancement requirement, the method further includes: reporting, by the user equipment, the coverage enhancement requirement to the base station, so that the base station determines the coverage enhancement requirement of the user equipment.

With reference to the first aspect or the second possible implementation manner, in a third possible implementation manner, the reporting, by the user equipment, the coverage enhancement requirement to the base station specifically includes: reporting, by the user equipment at a first moment, a first coverage enhancement requirement to the base station in a random access process, where the first coverage enhancement requirement has first precision; and reporting, by the user equipment, a first message to the base station at a second moment after the first moment, where the first message is used to instruct the base station to adjust, based on the first message, the first coverage enhancement requirement to a second coverage enhancement requirement, the second coverage enhancement requirement has second precision, and the second precision is higher than the first precision.

With reference to the first aspect or the third possible implementation manner, in a fourth possible implementation manner, after the reporting, by the user equipment, a first message to the base station, the method further includes: storing, by the user equipment, the second coverage enhancement requirement, so that the user equipment uses the second coverage enhancement requirement in a next random access process.

With reference to the first aspect, in a fifth possible implementation manner, the obtaining, by user equipment, a coverage enhancement requirement specifically includes: receiving, by the user equipment, a coverage enhancement requirement indication message delivered by the base station; and obtaining, by the user equipment, the coverage enhancement requirement according to the coverage enhancement requirement indication message.

With reference to the first aspect or the fifth possible implementation manner, in a sixth possible implementation manner, before the receiving, by the user equipment, a coverage enhancement requirement indication message delivered by the base station, the method further includes: reporting, by the user equipment, a message to the base station, so that the base station generates the coverage enhancement requirement indication message according to the message reported by the user equipment.

With reference to the first aspect or the sixth possible implementation manner, in a seventh possible implementation manner, the reporting, by the user equipment, a message to the base station, so that the base station generates the coverage enhancement requirement indication message according to the message reported by the user equipment specifically includes: reporting, by the user equipment, a first coverage enhancement requirement to the base station at a first moment by using a random access preamble sequence, where the first coverage enhancement requirement has first precision, so that the base station generates the coverage enhancement requirement indication message at a second moment after the first moment according to a message reported by the user equipment at a moment between the first moment and the second moment, where the coverage enhancement requirement indication message is used to instruct the user equipment to adjust the first coverage enhancement requirement to a second coverage enhancement requirement, the second coverage enhancement requirement has second precision, and the second precision is higher than the first precision.

With reference to the first aspect or the fifth possible implementation manner, in an eighth possible implementation manner, the receiving, by the user equipment, a coverage enhancement requirement indication message delivered by the base station is specifically: receiving, by the user equipment, the coverage enhancement requirement indication message delivered by the base station by using a random access response message.

With reference to the first aspect or the fifth possible implementation manner, in a ninth possible implementation manner, after the obtaining, by the user equipment, the coverage enhancement requirement according to the coverage enhancement requirement indication message, the method further includes: storing, by the user equipment, the coverage enhancement requirement, so that the user equipment uses the coverage enhancement requirement in a next random access process.

With reference to the first aspect or the first possible implementation manner to the ninth possible implementation manner, in a tenth possible implementation manner, the communicating, by the user equipment, with a base station according to the coverage enhancement requirement is specifically: communicating, by the user equipment, with the base station according to signal repetition times corresponding to the coverage enhancement requirement.

With reference to the first aspect or the tenth possible implementation manner, in an eleventh possible implementation manner, when the coverage enhancement requirement is at a first level, the signal repetition times corresponding to the coverage enhancement requirement is a first value; when the coverage enhancement requirement is at a second level higher than the first level, the signal repetition times corresponding to the second coverage enhancement requirement is a second value greater than the first value; and when the coverage enhancement requirement is at a third level lower than the first level, the signal repetition times corresponding to the coverage enhancement requirement is a third value less than the first value.

With reference to the first aspect or the eleventh possible implementation manner, in a twelfth possible implementation manner, when the coverage enhancement requirement is at a specified level, the signal repetition times corresponding to the coverage enhancement requirement is 0.

With reference to the first aspect or the first possible implementation manner to the ninth possible implementation manner, in a thirteenth possible implementation manner, a coverage enhancement technology includes a requirement relaxing technology, a signal repetition technology, power spectrum density boosting, and power boosting; and when the coverage requirement is at a specified level, the communicating, by the user equipment, with a base station according to the coverage enhancement requirement is specifically: communicating, by the user equipment according to the coverage enhancement requirement, with the base station by using another technology, in the coverage enhancement technology, except the signal repetition technology.

According to a second aspect, an embodiment further provides an information processing method, including obtaining, by a base station, a coverage enhancement requirement of user equipment, and communicating, by the base station, with the user equipment, according to the coverage enhancement requirement.

With reference to the second aspect, in a first possible implementation manner, the obtaining, by a base station, a coverage enhancement requirement of user equipment specifically includes: receiving, by the base station at a first moment, a first coverage enhancement requirement reported by the user equipment to the base station in a random access process, where the first coverage enhancement requirement has first precision; and receiving, by the base station at a second moment after the first moment, a first message reported by the user equipment, and adjusting the first coverage enhancement requirement to a second coverage enhancement requirement according to the first message, where the second coverage enhancement requirement has second precision, and the second precision is higher than the first precision.

With reference to the second aspect, in a second possible implementation manner, the obtaining, by a base station, a coverage enhancement requirement of user equipment specifically includes: obtaining, by the base station, the coverage enhancement requirement of the user equipment according to a message reported by the user equipment.

With reference to the second aspect or the second possible implementation manner, in a third possible implementation manner, the obtaining, by the base station, the coverage enhancement requirement of the user equipment according to a message reported by the user equipment specifically includes: receiving, by the base station at a first moment, a first coverage enhancement requirement reported by the user equipment by using a random access preamble sequence, where the first coverage enhancement requirement has first precision; and at a second moment after the first moment according to a message reported by the user equipment at a moment between the first moment and the second moment, obtaining, by the base station, a second coverage enhancement requirement of the user equipment, and generating the coverage enhancement requirement indication message, where the coverage enhancement requirement indication message is used to instruct the user equipment to adjust the first coverage enhancement requirement to the second coverage enhancement requirement, the second coverage enhancement requirement has second precision, and the second precision is higher than the first precision.

With reference to the second aspect or the third possible implementation manner, in a fourth possible implementation manner, after the generating, by the base station, the coverage enhancement requirement indication message according to a message reported by the user equipment at a moment between the first moment and the second moment, the method further includes: delivering, by the base station, the coverage enhancement requirement indication message to the user equipment.

With reference to the second aspect or the fourth possible implementation manner, in a fifth possible implementation manner, the delivering, by the base station, the coverage enhancement requirement indication message to the user equipment is specifically: delivering, by the base station, the coverage enhancement requirement indication message to the user equipment by using a random access response message.

With reference to the second aspect or the first possible implementation manner to the fifth possible implementation manner, in a sixth possible implementation manner, the communicating, by the base station, with the user equipment according to the coverage enhancement requirement is specifically: communicating, by the base station, with the user equipment according to signal repetition times corresponding to the coverage enhancement requirement.

With reference to the second aspect or the sixth possible implementation manner, in a seventh possible implementation manner, when the coverage enhancement requirement is at a first level, the signal repetition times corresponding to the coverage enhancement requirement is a first value; when the coverage enhancement requirement is at a second level higher than the first level, the signal repetition times corresponding to the second coverage enhancement requirement is a second value not less than the first value; and when the coverage enhancement requirement is at a third level lower than the first level, the signal repetition times corresponding to the coverage enhancement requirement is a third value not greater than the first value.

With reference to the second aspect or the seventh possible implementation manner, in an eighth possible implementation manner, when the coverage enhancement requirement is at a specified level, the signal repetition times corresponding to the coverage enhancement requirement is 0.

With reference to the second aspect or the first possible implementation manner to the fifth possible implementation manner, in a ninth possible implementation manner, a coverage enhancement technology includes a requirement relaxing technology, a signal repetition technology, power spectrum density boosting, and power boosting; and when the coverage requirement is at a specified level, the communicating, by the base station, with the user equipment according to the coverage enhancement requirement is specifically: communicating, by the base station according to the coverage enhancement requirement, with the user equipment by using another technology, in the coverage enhancement technology, except the signal repetition technology.

According to a third aspect, an embodiment further provides user equipment, including: an obtaining unit, configured to obtain a coverage enhancement requirement; and a communication unit, configured to communicate with a base station according to the coverage enhancement requirement.

With reference to the third aspect, in a first possible implementation manner, the user equipment further includes a storage unit, where the storage unit is configured to: after the obtaining unit obtains the coverage enhancement requirement, store the coverage enhancement requirement, so that the user equipment uses the coverage enhancement requirement in a next random access process.

With reference to the third aspect, in a second possible implementation manner, the communication unit is further configured to: after the obtaining unit obtains the coverage enhancement requirement, report the coverage enhancement requirement to the base station, so that the base station determines the coverage enhancement requirement of the information processing user equipment.

With reference to the third aspect or the second possible implementation manner, in a third possible implementation manner, the communication unit is specifically configured to: report, at a first moment, a first coverage enhancement requirement to the base station in a random access process, where the first coverage enhancement requirement has first precision; and report a first message to the base station at a second moment after the first moment, where the first message is used to instruct the base station to adjust, based on the first message, the first coverage enhancement requirement to a second coverage enhancement requirement, the second coverage enhancement requirement has second precision, and the second precision is higher than the first precision.

With reference to the third aspect or the third possible implementation manner, in a fourth possible implementation manner, the user equipment further includes a storage unit, configured to store the second coverage enhancement requirement, so that the user equipment uses the second coverage enhancement requirement in a next random access process.

With reference to the third aspect, in a fifth possible implementation manner, the obtaining unit is specifically configured to receive a coverage enhancement requirement indication message delivered by the base station, and obtain the coverage enhancement requirement according to the coverage enhancement requirement indication message.

With reference to the third aspect or the fifth possible implementation manner, in a sixth possible implementation manner, the communication unit is further configured to: before the obtaining unit receives the coverage enhancement requirement indication message delivered by the base station, report a message to the base station, so that the base station generates the coverage enhancement requirement indication message according to the message reported by the user equipment.

With reference to the third aspect or the sixth possible implementation manner, in a seventh possible implementation manner, the communication unit is specifically configured to report a first coverage enhancement requirement to the base station at a first moment by using a random access preamble sequence, where the first coverage enhancement requirement has first precision, so that the base station generates the coverage enhancement requirement indication message at a second moment after the first moment according to a message reported by the user equipment at a moment between the first moment and the second moment, where the coverage enhancement requirement indication message is used to instruct the user equipment to adjust the first coverage enhancement requirement to a second coverage enhancement requirement, the second coverage enhancement requirement has second precision, and the second precision is higher than the first precision.

With reference to the third aspect or the fifth possible implementation manner, in an eighth possible implementation manner, the obtaining unit is specifically configured to receive the coverage enhancement requirement indication message delivered by the base station by using a random access response message.

With reference to the third aspect or the fifth possible implementation manner, in a ninth possible implementation manner, the user equipment further includes a storage unit, configured to: after the obtaining unit device obtains the coverage enhancement requirement according to the coverage enhancement requirement indication message, store the coverage enhancement requirement, so that the user equipment uses the coverage enhancement requirement in a next random access process.

With reference to the third aspect or the first possible implementation manner to the ninth possible implementation manner, in a tenth possible implementation manner, the communication unit is specifically configured to communicate with the base station according to signal repetition times corresponding to the coverage enhancement requirement.

With reference to the third aspect or the tenth possible implementation manner, in an eleventh possible implementation manner, when the coverage enhancement requirement is at a first level, the signal repetition times corresponding to the coverage enhancement requirement is a first value; when the coverage enhancement requirement is at a second level higher than the first level, the signal repetition times corresponding to the second coverage enhancement requirement is a second value greater than the first value; and when the coverage enhancement requirement is at a third level lower than the first level, the signal repetition times corresponding to the coverage enhancement requirement is a third value less than the first value.

With reference to the third aspect or the eleventh possible implementation manner, in a twelfth possible implementation manner, when the coverage enhancement requirement is at a specified level, the signal repetition times corresponding to the coverage enhancement requirement is 0.

With reference to the third aspect or the first possible implementation manner to the ninth possible implementation manner, in a thirteenth possible implementation manner, a coverage enhancement technology includes a requirement relaxing technology, a signal repetition technology, power spectrum density boosting, and power boosting; and when the coverage requirement is at a specified level, the communication unit is specifically configured to communicate, according to the coverage enhancement requirement, with the base station by using another technology, in the coverage enhancement technology, except the signal repetition technology.

According to a fourth aspect, an embodiment further provides a base station, including: an obtaining unit, configured to obtain a coverage enhancement requirement of user equipment; and a communication unit, configured to communicate with the user equipment according to the coverage enhancement requirement.

With reference to the fourth aspect, in a first possible implementation manner, the obtaining unit is specifically configured to: receive, at a first moment, a first coverage enhancement requirement reported by the user equipment to the base station in a random access process, where the first coverage enhancement requirement has first precision; and receive, at a second moment, a first message reported by the user equipment, and adjust the first coverage enhancement requirement to a second coverage enhancement requirement according to the first message, where the second coverage enhancement requirement has second precision, and the second precision is higher than the first precision.

With reference to the fourth aspect, in a second possible implementation manner, the obtaining unit is specifically configured to obtain the coverage enhancement requirement of the user equipment according to a message reported by the user equipment.

With reference to the fourth aspect or the second possible implementation manner, in a third possible implementation manner, the obtaining unit is specifically configured to: receive, at a first moment, a first coverage enhancement requirement reported by the user equipment by using a random access preamble sequence, where the first coverage enhancement requirement has first precision; and at a second moment after the first moment according to a message reported by the user equipment at a moment between the first moment and the second moment, obtain a second coverage enhancement requirement of the user equipment, and generate the coverage enhancement requirement indication message, where the coverage enhancement requirement indication message is used to instruct the user equipment to adjust the first coverage enhancement requirement to the second coverage enhancement requirement, the second coverage enhancement requirement has second precision, and the second precision is higher than the first precision.

With reference to the fourth aspect or the third possible implementation manner, in a fourth possible implementation manner, the communication unit is further configured to: after the obtaining unit generates the coverage enhancement requirement indication message according to the message reported by the user equipment at the moment between the first moment and the second moment, deliver the coverage enhancement requirement indication message to the user equipment.

With reference to the fourth aspect or the fourth possible implementation manner, in a fifth possible implementation manner, the communication unit is specifically configured to deliver the coverage enhancement requirement indication message to the user equipment by using a random access response message.

With reference to the fourth aspect or the first possible implementation manner to the fifth possible implementation manner, in a sixth possible implementation manner, the communication unit is specifically configured to communicate with the user equipment according to signal repetition times corresponding to the coverage enhancement requirement.

With reference to the fourth aspect or the sixth possible implementation manner, in a seventh possible implementation manner, when the coverage enhancement requirement is at a first level, the signal repetition times corresponding to the coverage enhancement requirement is a first value; when the coverage enhancement requirement is at a second level higher than the first level, the signal repetition times corresponding to the second coverage enhancement requirement is a second value greater than the first value; and when the coverage enhancement requirement is at a third level lower than the first level, the signal repetition times corresponding to the coverage enhancement requirement is a third value less than the first value.

With reference to the fourth aspect or the seventh possible implementation manner, in an eighth possible implementation manner, when the coverage enhancement requirement is at a specified level, the signal repetition times corresponding to the coverage enhancement requirement is 0.

With reference to the fourth aspect or the first possible implementation manner to the fifth possible implementation manner, in a ninth possible implementation manner, a coverage enhancement technology includes a requirement relaxing technology, a signal repetition technology, power spectrum density boosting, and power boosting; and when the coverage requirement is at a specified level, the communication unit is specifically configured to communicate, according to the coverage enhancement requirement, with the user equipment by using another technology, in the coverage enhancement technology, except the signal repetition technology.

According to a fifth aspect, an embodiment further provides user equipment, including: a processor, configured to obtain a coverage enhancement requirement; and a transceiver, configured to communicate with a base station according to the coverage enhancement requirement.

With reference to the fifth aspect, in a first possible implementation manner, the user equipment further includes a memory, where the memory is configured to: after the processor obtains the coverage enhancement requirement, store the coverage enhancement requirement, so that the user equipment uses the coverage enhancement requirement in a next random access process.

With reference to the fifth aspect, in a second possible implementation manner, the transceiver is further configured to: after the processor obtains the coverage enhancement requirement, report the coverage enhancement requirement to the base station, so that the base station determines the coverage enhancement requirement of the information processing user equipment.

With reference to the fifth aspect or the second possible implementation manner, in a third possible implementation manner, the transceiver is specifically configured to: report, at a first moment, a first coverage enhancement requirement to the base station in a random access process, where the first coverage enhancement requirement has first precision; and report a first message to the base station at a second moment after the first moment, where the first message is used to instruct the base station to adjust, based on the first message, the first coverage enhancement requirement to a second coverage enhancement requirement, the second coverage enhancement requirement has second precision, and the second precision is higher than the first precision.

With reference to the fifth aspect or the third possible implementation manner, in a fourth possible implementation manner, the user equipment further includes a memory, where the memory is configured to store the second coverage enhancement requirement, so that the user equipment uses the second coverage enhancement requirement in a next random access process.

With reference to the fifth aspect, in a fifth possible implementation manner, the processor is specifically configured to receive a coverage enhancement requirement indication message delivered by the base station, and obtain the coverage enhancement requirement according to the coverage enhancement requirement indication message.

With reference to the fifth aspect or the fifth possible implementation manner, in a sixth possible implementation manner, the transceiver is further configured to: before the processor receives the coverage enhancement requirement indication message delivered by the base station, report a message to the base station, so that the base station generates the coverage enhancement requirement indication message according to the message reported by the user equipment.

With reference to the fifth aspect or the sixth possible implementation manner, in a seventh possible implementation manner, the transceiver is specifically configured to report a first coverage enhancement requirement to the base station at a first moment by using a random access preamble sequence, where the first coverage enhancement requirement has first precision, so that the base station generates the coverage enhancement requirement indication message at a second moment after the first moment according to a message reported by the user equipment at a moment between the first moment and the second moment, where the coverage enhancement requirement indication message is used to instruct the user equipment to adjust the first coverage enhancement requirement to a second coverage enhancement requirement, the second coverage enhancement requirement has second precision, and the second precision is higher than the first precision.

With reference to the fifth aspect or the fifth possible implementation manner, in an eighth possible implementation manner, the processor is specifically configured to receive the coverage enhancement requirement indication message delivered by the base station by using a random access response message.

With reference to the fifth aspect or the fifth possible implementation manner, in a ninth possible implementation manner, the user equipment further includes a memory, where the memory is configured to: after the processor device obtains the coverage enhancement requirement according to the coverage enhancement requirement indication message, store the coverage enhancement requirement, so that the user equipment uses the coverage enhancement requirement in a next random access process.

With reference to the fifth aspect or the first possible implementation manner to the ninth possible implementation manner, in a tenth possible implementation manner, the transceiver is specifically configured to communicate with the base station according to signal repetition times corresponding to the coverage enhancement requirement.

With reference to the fifth aspect or the tenth possible implementation manner, in an eleventh possible implementation manner, when the coverage enhancement requirement is at a first level, the signal repetition times corresponding to the coverage enhancement requirement is a first value; when the coverage enhancement requirement is at a second level higher than the first level, the signal repetition times corresponding to the second coverage enhancement requirement is a second value greater than the first value; and when the coverage enhancement requirement is at a third level lower than the first level, the signal repetition times corresponding to the coverage enhancement requirement is a third value less than the first value.

With reference to the fifth aspect or the eleventh possible implementation manner, in a twelfth possible implementation manner, when the coverage enhancement requirement is at a specified level, the signal repetition times corresponding to the coverage enhancement requirement is 0.

With reference to the fifth aspect or the first possible implementation manner to the ninth possible implementation manner, in a thirteenth possible implementation manner, a coverage enhancement technology includes a requirement relaxing technology, a signal repetition technology, power spectrum density boosting, and power boosting; and when the coverage requirement is at a specified level, the transceiver is specifically configured to communicate, according to the coverage enhancement requirement, with the base station by using another technology, in the coverage enhancement technology, except the signal repetition technology.

According to a sixth aspect, an embodiment further provides a base station, including: a processor, configured to obtain a coverage enhancement requirement of user equipment; and a transceiver, configured to communicate with the user equipment according to the coverage enhancement requirement.

With reference to the fourth aspect, in a first possible implementation manner, the processor is specifically configured to: receive, at a first moment, a first coverage enhancement requirement reported by the user equipment to the base station in a random access process, where the first coverage enhancement requirement has first precision; and receive, at a second moment, a first message reported by the user equipment, and adjust the first coverage enhancement requirement to a second coverage enhancement requirement according to the first message, where the second coverage enhancement requirement has second precision, and the second precision is higher than the first precision.

With reference to the fourth aspect, in a second possible implementation manner, the processor is specifically configured to obtain the coverage enhancement requirement of the user equipment according to a message reported by the user equipment.

With reference to the fourth aspect or the second possible implementation manner, in a third possible implementation manner, the processor is specifically configured to: receive, at a first moment, a first coverage enhancement requirement reported by the user equipment by using a random access preamble sequence, where the first coverage enhancement requirement has first precision; and at a second moment after the first moment according to a message reported by the user equipment at a moment between the first moment and the second moment, obtain a second coverage enhancement requirement of the user equipment and generate the coverage enhancement requirement indication message, where the coverage enhancement requirement indication message is used to instruct the user equipment to adjust the first coverage enhancement requirement to the second coverage enhancement requirement, the second coverage enhancement requirement has second precision, and the second precision is higher than the first precision.

With reference to the fourth aspect or the third possible implementation manner, in a fourth possible implementation manner, the transceiver is further configured to: after the processor generates the coverage enhancement requirement indication message according to the message reported by the user equipment at the moment between the first moment and the second moment, deliver the coverage enhancement requirement indication message to the user equipment.

With reference to the fourth aspect or the fourth possible implementation manner, in a fifth possible implementation manner, the transceiver is specifically configured to deliver the coverage enhancement requirement indication message to the user equipment by using a random access response message.

With reference to the fourth aspect or the first possible implementation manner to the fifth possible implementation manner, in a sixth possible implementation manner, the transceiver is specifically configured to communicate with the user equipment according to signal repetition times corresponding to the coverage enhancement requirement.

With reference to the fourth aspect or the sixth possible implementation manner, in a seventh possible implementation manner, when the coverage enhancement requirement is at a first level, the signal repetition times corresponding to the coverage enhancement requirement is a first value; when the coverage enhancement requirement is at a second level higher than the first level, the signal repetition times corresponding to the second coverage enhancement requirement is a second value greater than the first value; and when the coverage enhancement requirement is at a third level lower than the first level, the signal repetition times corresponding to the coverage enhancement requirement is a third value less than the first value.

With reference to the fourth aspect or the seventh possible implementation manner, in an eighth possible implementation manner, when the coverage enhancement requirement is at a specified level, the signal repetition times corresponding to the coverage enhancement requirement is 0.

With reference to the fourth aspect or the first possible implementation manner to the fifth possible implementation manner, in a ninth possible implementation manner, a coverage enhancement technology includes a requirement relaxing technology, a signal repetition technology, power spectrum density boosting, and power boosting; and when the coverage requirement is at a specified level, the transceiver is specifically configured to communicate, according to the coverage enhancement requirement, with the user equipment by using another technology, in the coverage enhancement technology, except the signal repetition technology.

Beneficial effects of embodiments are as follows.

Because the following technical solution is used: user equipment obtains a coverage enhancement requirement and communicates with a base station according to the coverage enhancement requirement, in a case of ensuring that the user equipment accurately communicates with the base station, the user equipment accurately communicates with the base station according to the obtained coverage enhancement requirement, which avoids a case in which the base station still adds, when communicating with user equipment whose communication status is better, a same quantity of communication resources added when communicating with user equipment whose communication status is poorer, thereby resolving a technical problem in the prior art that a waste of resources exists when a base station communicates with user equipment, and implementing a technical effect of reducing a waste of resources.

DETAILED DESCRIPTION OF ILLUSTRATIVE EMBODIMENTS

Embodiments provide an information processing method, user equipment, and a base station, so as to resolve a technical problem in the prior art that a waste of resources exists when a base station communicates with user equipment.

To make the objectives, technical solutions, and advantages of the embodiments clearer, the following clearly describes the technical solutions in the embodiments with reference to the accompanying drawings in the embodiments. Apparently, the described embodiments are some but not all of the embodiments. All other embodiments obtained by persons of ordinary skill in the art based on the embodiments without creative efforts shall fall within the protection scope.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following describes in detail with reference to the accompanying drawings.

Embodiment 1

Figure 1:
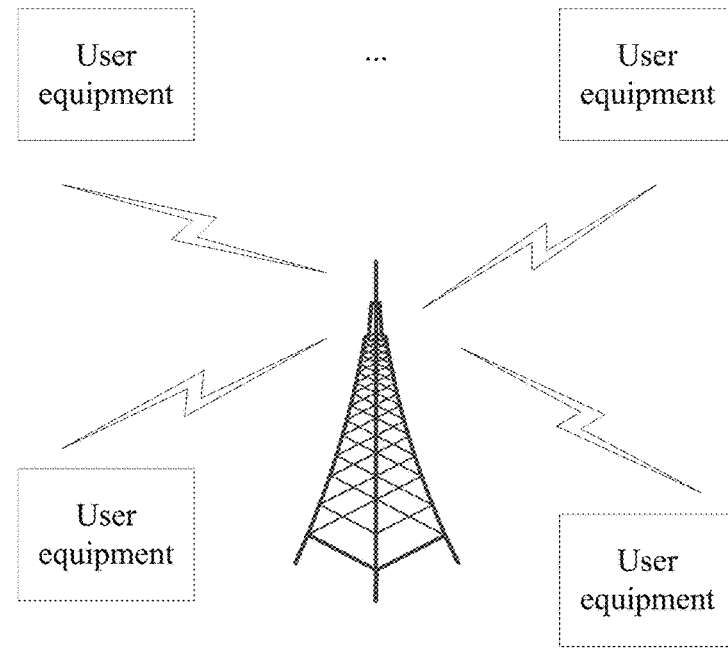
FIG. 1 is a schematic diagram of communication between multiple user equipments and a base station according to an embodiment.

Referring to FIG. 1, FIG. 1 is a schematic diagram of communication between multiple user equipments and a base station according to an embodiment.

Figure 2:
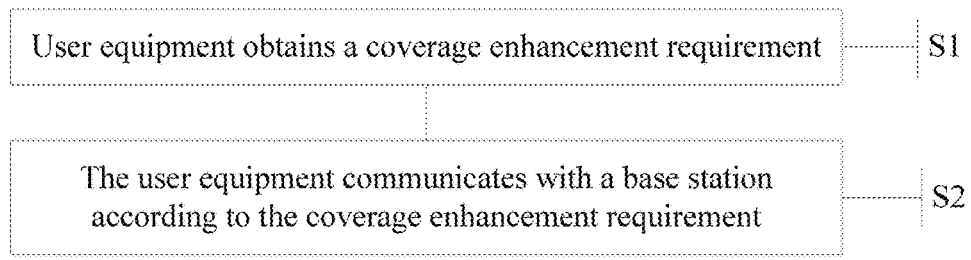
FIG. 2 is a flowchart of an information processing method on a user equipment side according to an embodiment.

According to a first aspect, on a user equipment side, this embodiment provides an information processing method. Referring to FIG. 2, FIG. 2 is a flowchart of an information processing method according to an embodiment. As shown in FIG. 2, the method includes:

S1: User equipment obtains a coverage enhancement requirement.

S2: The user equipment communicates with a base station according to the coverage enhancement requirement.

In step S1, specifically, the user equipment may obtain the coverage enhancement requirement of the user equipment by acquiring some system signals of the base station, such as downlink reference signals continually delivered by the base station; or the user equipment may obtain the coverage enhancement requirement of the user equipment by receiving a coverage enhancement requirement indication message delivered by the base station.

In this embodiment, the coverage enhancement requirement refers to an extent of coverage enhancement support required by the user equipment in a process of communicating with the base station, which can enable the user equipment to access a network to obtain a service. For example, the coverage enhancement requirement may be used to indicate one or several of a coverage enhancement level, an index of a coverage enhancement level, signal repetition times, an index of signal repetition times, a coverage enhancement method, and an index of a coverage enhancement method. Certainly, in an actual application, a representation method of the coverage enhancement requirement is not limited herein; the coverage enhancement requirement may also be used to indicate another parameter according to an actual condition, so as to meet a requirement of the actual condition, and details are not described herein again.

Figure 3A:
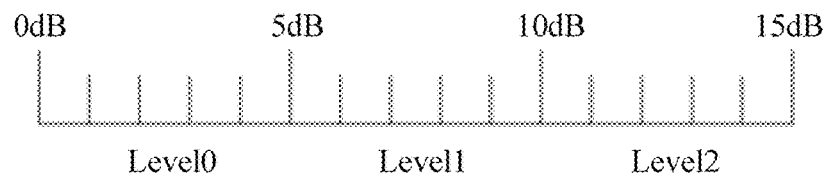
FIG. 3A is a schematic diagram of level classification of a first coverage enhancement requirement according to an embodiment.
Figure 3B:
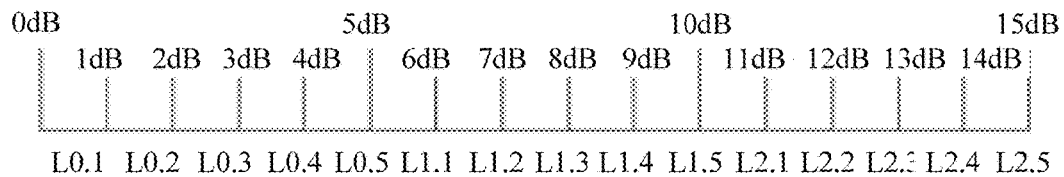
FIG. 3B is a schematic diagram of level classification of a second coverage enhancement requirement according to an embodiment.

In a specific implementation process, the coverage enhancement requirement may be a first coverage enhancement requirement that has lower precision, or may be a second coverage enhancement requirement that has higher precision. An example of performing coverage enhancement level classification on 0 dB to 15 dB is used. Referring to FIG. 3A and FIG. 3B, FIG. 3A is a schematic diagram of level classification of a first coverage enhancement requirement according to an embodiment, and FIG. 3B is a schematic diagram of level classification of a second coverage enhancement requirement according to an embodiment.

As shown in FIG. 3A, classification of the first coverage enhancement requirement is: path loss≤5 dB, which is coverage enhancement level 0; 5 dB<path loss≤10 dB, which is coverage enhancement level 1; and path loss>10 dB, which is coverage enhancement level 2. In an example in which a coverage enhancement technology is a signal repetition technology, signal repetition times corresponding to level 0 may be 5, signal repetition times corresponding to level 1 may be 10, and signal repetition times corresponding to level 2 may be 15.

As shown in FIG. 3B, classification of the second coverage enhancement requirement is: path loss≤1 dB, which is a coverage enhancement level level 0.1; 1 dB<path loss≤2 dB, which is a coverage enhancement level level 0.2; 2 dB<path loss≤3 dB, which is a coverage enhancement level level 0.3; 3 dB<path loss≤4 dB, which is a coverage enhancement level level 0.4; 4 dB<path loss≤5 dB, which is a coverage enhancement level level 0.5; . . . ; and 14 dB<path loss≤15 dB, which is a coverage enhancement level level 2.5. In an example in which a coverage enhancement technology is a signal repetition technology, signal repetition times corresponding to level 0.1 may be 1, signal repetition times corresponding to level 0.2 may be 2, signal repetition times corresponding to level 0.3 may be 3, signal repetition times corresponding to level 0.4 may be 4, signal repetition times corresponding to level 0.5 may be 5, . . . , and signal repetition times corresponding to level 2.5 may be 15.

It can be seen, by comparing signal repetition times corresponding to each level of the first coverage enhancement requirement with that corresponding to each level of the second coverage enhancement requirement, that because precision for level classification of the second coverage enhancement requirement is higher, if the second coverage enhancement requirement is used as the coverage enhancement requirement, coverage enhancement may be more targeted, and a waste of resources can be further reduced.

However, if the second coverage enhancement requirement is directly used when a random access preamble is being sent in a random access process, a problem of an excessively high probability of a conflict occurring between user equipments in the random access process is caused. Specifically, the random access preamble sequence includes three types of resources: a time domain, a frequency domain, and code division. An example of code division is used. If level classification is performed according to the first coverage enhancement requirement, all code resources need to be classified into three parts. The user equipment selects a proper code resource according to a measuring result of the user equipment, to initiate a random access process, and the base station determines, by using a received code, a coverage enhancement requirement level to which the user equipment belongs. If codes used by two user equipments in a random access process are the same, the random access process of the two users may be invalid. This is a problem of a conflict in a random access process. When more specific level classification is performed on the coverage enhancement requirement, there are more groups obtained by classifying code resources, and there are less codes in each group; if there are less code resources in the group, a probability of selecting a same code by user equipments in the group is larger, and there are also more invalid random access processes of user equipments, so that a probability of a conflict occurring between the user equipments in the group in a random access process is larger.

According to two manners of obtaining a coverage enhancement message by the user equipment, the following part specifically describes a method about how to use the second coverage enhancement requirement in communication between the user equipment and the base station to further reduce a waste of resources, without affecting a probability of a conflict occurring between user equipments in a random access process.

In a first manner, the user equipment obtains the coverage enhancement requirement of the user equipment by acquiring some system signals of the base station, such as downlink reference signals continually delivered by the base station.

After obtaining the coverage enhancement requirement of the user equipment by acquiring some system signals of the base station, the user equipment needs to further report the coverage enhancement requirement to the base station, so that the base station determines a current coverage enhancement requirement of the user equipment.

It should be noted that, if the coverage enhancement requirement reported at this time is the first coverage enhancement requirement shown in FIG. 3A, the coverage enhancement requirement can be directly reported. If the coverage enhancement requirement reported at this time is the second coverage enhancement requirement shown in FIG. 3B, the coverage enhancement requirement needs to be reported by performing the following steps:

The user equipment reports, at a first moment, a first coverage enhancement requirement to the base station in a random access process, where the first coverage enhancement requirement has first precision; and the user equipment reports a first message to the base station at a second moment after the first moment, where the first message is used to instruct the base station to adjust, based on the first message, the first coverage enhancement requirement to a second coverage enhancement requirement, the second coverage enhancement requirement has second precision, and the second precision is higher than the first precision.

Specifically, the user equipment may report the first coverage enhancement requirement to the base station at the first moment at the same time when sending a random access preamble sequence, where the first coverage enhancement requirement may be the first coverage enhancement requirement shown in FIG. 3, the first coverage enhancement requirement has the first precision, and 5 db is used as a level to classify the coverage enhancement requirement.

That the user equipment reports a first message to the base station at a second moment after the first moment may be, for example, reporting the first message to the base station by using a third message, that is, Msg3, in the random access process, where the first message includes indication information of adjusting the first coverage enhancement requirement to the second coverage enhancement requirement. Certainly, the user equipment may also report the first message to the base station by using another newly-defined dedicated message, which is not limited herein.

After receiving, at the second moment, the first message reported by the user equipment, the base station may adjust the first coverage enhancement requirement to the second coverage enhancement requirement, where the second coverage enhancement requirement may be the second coverage enhancement requirement shown in FIG. 3B, the second coverage enhancement requirement has the second precision, and 1 db is used as a level to classify the coverage enhancement requirement.

In an actual application, the first message may indicate a relative value for adjusting the first coverage enhancement requirement to the second coverage enhancement requirement, that is, the first message is used to instruct the user equipment to adjust the first coverage enhancement requirement to obtain the second coverage enhancement requirement. For example, the first coverage enhancement requirement reported by the user equipment at the first moment is at level 0, and if the first message indicates a coverage enhancement requirement level 2, the base station may determine that the second coverage enhancement requirement of the user equipment is at level 0.2. Certainly, the first message may also indicate an absolute value for adjusting the first coverage enhancement requirement to the second coverage enhancement requirement, that is, the first message directly indicates the second coverage enhancement requirement of the user equipment. For example, whether the first coverage enhancement requirement reported by the user equipment at the first moment is at level 0 or level 1, if the first message indicates a coverage enhancement requirement level 2, the base station may determine that the second coverage enhancement requirement of the user equipment is at level 0.2.

It can be seen from the foregoing part, that after user equipment reports a second coverage enhancement requirement to a base station, the base station can determine that a coverage enhancement requirement of the user equipment is the second coverage enhancement requirement whose precision is higher than first precision of a first coverage enhancement requirement, and communicate with the user equipment according to the second coverage enhancement requirement, thereby further reducing a waste of resources.

Certainly, after the user equipment reports the second coverage enhancement requirement to the base station, the user equipment may further store the second coverage enhancement requirement, so that the user equipment uses the second coverage enhancement requirement in a next random access process, for example, may use the second coverage enhancement requirement when sending a random access preamble sequence next time, which is certainly not limited herein in an actual application, for example, may further use the second coverage enhancement requirement when sending a data channel signal or sending a control channel signal. Details are not described herein again. It can be seen that because the following technical solution is used: the coverage enhancement requirement used by the user equipment in communication with the base station is stored, so that the user equipment uses the coverage enhancement requirement in a next random access process, the user equipment can quickly and accurately obtain the coverage enhancement requirement of the user equipment in the next random access process, thereby further reducing a waste of resources.

In a second manner, the user equipment receives a coverage enhancement requirement indication message delivered by the base station, so as to obtain the coverage enhancement requirement of the user equipment.

Specifically, the user equipment may report a message to the base station, so that the base station can generate the coverage enhancement requirement indication message according to the message reported by the user equipment, and deliver the generated coverage enhancement requirement indication message to the user equipment; the user equipment may receive the coverage enhancement requirement indication message, so as to obtain the coverage enhancement requirement of the user equipment. The coverage enhancement requirement herein may be only the first coverage enhancement requirement, or may include the second coverage enhancement requirement, which is not limited herein.

It should be noted that the message reported by the user equipment to the base station may include some particular uplink reference messages, and the messages are only used for measurement and the like by the base station, but another piece of useful information may not be reported, which is not limited herein.

Specifically, the user equipment may report a first coverage enhancement requirement to the base station at a first moment by using a random access preamble sequence, where the first coverage enhancement requirement has first precision, and the first coverage enhancement requirement may be the first coverage enhancement requirement shown in FIG. 3A, so that at a second moment after the first moment according to a message reported by the user equipment at a moment between the first moment and the second moment, the base station obtains a second coverage enhancement requirement of the user equipment, and generates the coverage enhancement requirement indication message used to instruct the user equipment to adjust the first coverage enhancement requirement to the second coverage enhancement requirement, where the second coverage enhancement requirement has second precision, and the second precision is higher than the first precision of the first coverage enhancement requirement. The second coverage enhancement requirement may be the second coverage enhancement requirement shown in FIG. 3B.

Certainly, in an actual application, the user equipment may not report the first coverage enhancement requirement, instead, start to report a message from the first moment, so that at the second moment after the first moment according to the message reported by the user equipment at the moment between the first moment and the second moment, the base station can obtain the second coverage enhancement requirement of the user equipment, and generate a coverage enhancement requirement indication message, where the coverage enhancement requirement indication message can indicate that the coverage enhancement requirement of the user equipment is the second coverage enhancement requirement. The second coverage enhancement requirement may be the second coverage enhancement requirement shown in FIG. 3B. It should be noted that, when generating the coverage enhancement requirement indication message according to the message reported by the user equipment, the base station may learn, by means of measurement and according to some messages instead of all messages reported at the moment between the first moment and the second moment, the coverage enhancement requirement required by the user equipment, so as to generate the coverage enhancement requirement indication message. Details are not described herein again.

In a specific implementation process, the user equipment may receive the coverage enhancement requirement indication message delivered by the base station by using a random access response (RAR) message.

Figure 4:
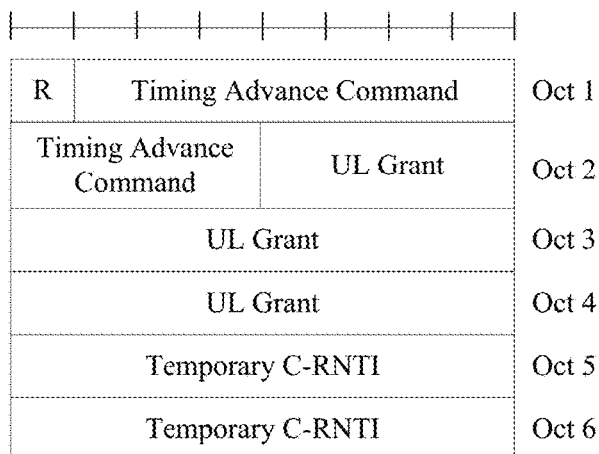
FIG. 4 is a schematic diagram of a format of a random access response message according to an embodiment.
Figure 5:
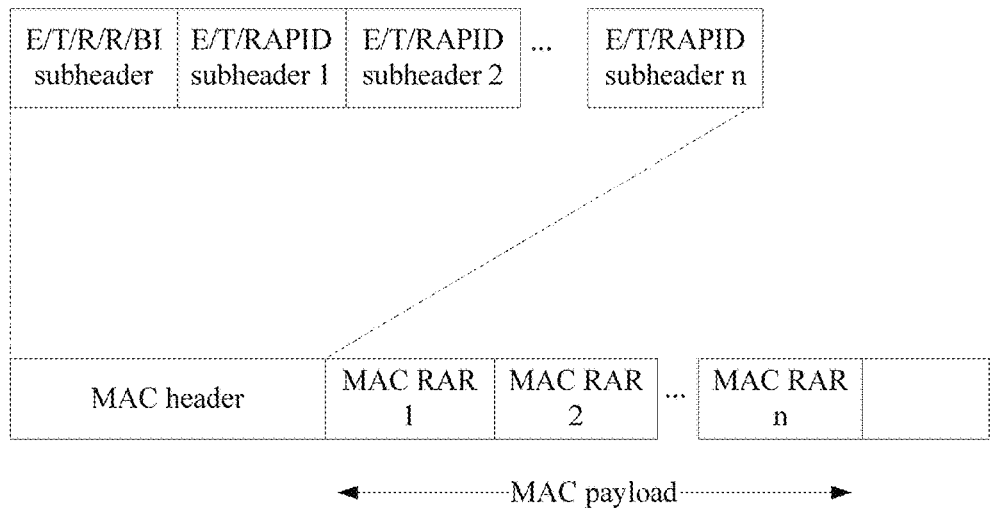
FIG. 5 is a schematic diagram of composition of a Media Access Control protocol data unit according to an embodiment.

For example, referring to FIG. 4, FIG. 4 is a schematic diagram of a format of a random access response message according to an embodiment. As shown in FIG. 4, each random access response message includes one reserved (R) bit. Further, referring to FIG. 5, a Media Access Control protocol data unit (MAC PDU) configured to carry a random access response message includes one Media Access Control header (MAC header) and several random access response messages. One Media Access Control header includes several Media Access Control subheaders (MAC subheader) shown in FIG. 6A, where the Media Access Control subheader shown in FIG. 6A does not include a reserved information bit, and includes at most one Media Access Control subheader shown in FIG. 6B, and the Media Access Control subheader shown in FIG. 6B includes two reserved information bits.

Referring to FIG. 4, FIG. 5, FIG. 6A, and FIG. 6B at the same time, if one Media Access Control protocol data unit includes n random access response messages, the entire Media Access Control protocol data unit includes M reserved information bits, where $n \leq M \leq n+2$, n is an integer greater than or equal to 1, and M is a positive integer.

When the base station transfers the coverage enhancement requirement to the user equipment by using the random access response message, the following two manners may be used:

Manner 1: The base station delivers the coverage enhancement requirement indication message based on a first coverage enhancement requirement reported by the user equipment, where the coverage enhancement requirement indication message may be an absolute value, that is, regardless of a level value of first coverage enhancement of the user equipment, the coverage enhancement requirement indication message directly indicates a second coverage enhancement requirement of the user equipment. For example, whether the first coverage enhancement requirement reported by the user equipment is at level 0 or level 1, if a level of the second coverage enhancement requirement indicated by the coverage enhancement requirement indication message delivered by the base station is 5, the user equipment determines, according to the coverage enhancement requirement, that a coverage enhancement level is level 0.5.

Manner 2: The base station delivers the coverage enhancement requirement indication message based on a first coverage enhancement requirement reported by the user equipment, where the coverage enhancement requirement indication message may be a relative value, that is, regardless of a level value of first coverage enhancement of the user equipment, the coverage enhancement requirement indication message directly indicates a second coverage enhancement requirement of the user equipment. For example, the first coverage enhancement requirement reported by the user is at level 1, and the coverage enhancement requirement indication message delivered by the base station is −2, the user equipment may determine, according to the first coverage enhancement requirement and the coverage enhancement requirement indication message, that a level of the coverage enhancement requirement of the user equipment is level 0.4 obtained by subtracting two levels from level 1; and if the base station delivers a level 2, the terminal considers a coverage enhancement level of the terminal to be level 1.2 obtained by adding two levels to level 1. In this manner, an information bit of one bit may indicate two relative values of the second level, for example, 0 indicates a coverage enhancement level plus (minus) one level, and 1 indicates a coverage enhancement level plus (minus) two levels. The information bit of one bit may also indicate an adjustment direction of a coverage enhancement level, for example, if the base station delivers 0, the terminal considers that the coverage enhancement level of the terminal needs to be adjusted downward by one level; and if the base station delivers 1, the terminal considers that the coverage enhancement level of the terminal needs to be adjusted upward by one level.

Figure 6A:
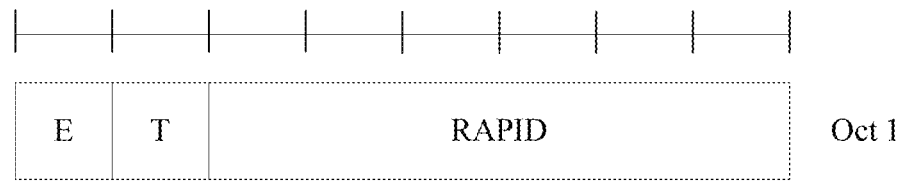
FIG. 6A is a schematic structural diagram of a Media Access Control subheader according to an embodiment.
Figure 6B:
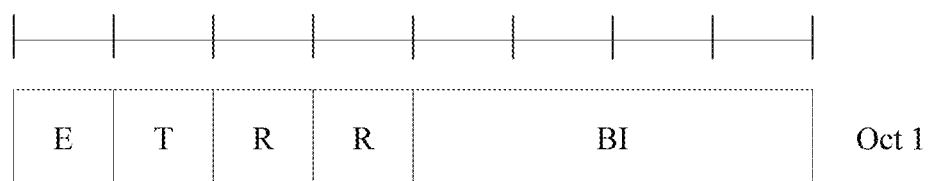
FIG. 6B is a schematic structural diagram of another Media Access Control subheader according to an embodiment.

In a specific implementation process, if one Medium Access Control header does not include one Medium Access Control subheader shown in FIG. 6B, the entire Medium Access Control protocol data unit includes n reserved information bits, where at least one reserved information bit may be used. If the Medium Access Control protocol data unit includes one reserved information bit, the coverage enhancement requirement may be transferred to the user equipment in the Manner 1 or Manner 2 described above. If the Medium Access Control protocol data unit includes n random access response messages, the Medium Access Control protocol data unit includes n reserved information bits. No matter whether coverage enhancement requirements that are of user equipments and corresponding to the n random access response messages are the same, the n reserved information bits may be jointly used. For example, two reserved information bits may indicate four relative values or absolute values of a level of the second coverage enhancement requirement; or one of the reserved information bits indicates an adjustment direction of a relative value, and the other reserved information bit is used to indicate an adjustment value, so that the coverage enhancement requirement is transferred to the user equipment. For more cases of the reserved information bit, details are not described again.

In a specific implementation process, if one Medium Access Control header includes one Medium Access Control subheader shown in FIG. 6A, the entire Medium Access Control protocol data unit includes n+2 reserved information bits, where at least three reserved information bits may be used, so that the coverage enhancement requirement may be transferred to the user equipment by jointly using the at least three reserved information bits. A specific process is the same as the foregoing process, and details are not described herein again.

Certainly, in addition to transferring the coverage enhancement requirement to the user equipment by using a reserved information bit of the random access response message, the coverage enhancement requirement may be transferred to the user equipment by using a newly added information bit of the random access response message.

It can be seen that it is absolutely no problem that the base station adds the coverage enhancement requirement indication message to the random access response message and delivers the random access response message to the user equipment, so as to transfer the second coverage enhancement requirement to the user equipment. After receiving the coverage enhancement requirement indication message delivered by the base station by using the random access response message, the user equipment can obtain the coverage enhancement requirement according to the coverage enhancement requirement indication message.

In a specific implementation process, after the user equipment obtains the coverage enhancement requirement according to the coverage enhancement requirement indication message delivered by the base station by using the random access response message, the user equipment may further store the coverage enhancement requirement, so that the user equipment uses the coverage enhancement requirement in a next random access process, where the coverage enhancement requirement herein may be the first coverage enhancement requirement or may be the second coverage enhancement requirement, which is not limited herein. For example, the user equipment may use the coverage enhancement requirement when sending a random access preamble sequence next time, so that the user equipment quickly and accurately determines the coverage enhancement requirement of the user equipment in a next random access process.

After the coverage enhancement requirement of the user equipment is obtained in step S1, step S2 in the information processing method provided in this embodiment is executed, that is, the user equipment communicates with the base station according to the coverage enhancement requirement.

In step S2, specifically, if the coverage enhancement requirement indicates a coverage enhancement level of the user equipment, and the user equipment and the base station predefine coverage enhancement technologies used for different coverage enhancement levels, the user equipment communicates with the base station by using a corresponding coverage enhancement technology and according to the coverage enhancement level indicated by the coverage enhancement requirement. It should be noted that the coverage enhancement requirement in step S2 may be the first coverage enhancement requirement described in the step S1 or may be the second coverage enhancement requirement, which is not limited herein.

For example, if the coverage enhancement requirement is at a first level, the coverage enhancement requirement may indicate that the coverage enhancement level of the user equipment is the first level; if a coverage enhancement technology that is predefined by the user equipment and the base station and used for the first level is a signal repetition technology, the user equipment communicates with the base station according to signal repletion times corresponding to the coverage enhancement requirement.

The signal repletion technology may be used to perform repetition on a frequency domain resource, that is, to send a same signal on multiple frequency domain resources at a same moment; or perform repetition on a time domain resource, that is, repeatedly send signals on a same frequency domain resource at different moments (which may be consecutive moments), so that the user equipment can accurately communicate with the base station.

Certainly, in an actual application, in addition to the signal repetition technology, the coverage enhancement technology may include a requirement relaxing technology, a power spectrum density boosting (PSD boosting) technology, a power boosting (PB) technology, and the like. The requirement relaxing technology means that in a case in which a random access process of the user equipment does not succeed, the user equipment is allowed to try for more times, so that the user equipment can accurately communicate with the base station. The power spectrum density boosting technology means, for example, that three resources are allocated to the user equipment for sending a message, but currently, only one resource is used for sending, and the other two resources are idle; in this case, power originally used for sending information on the three resources is centralized on the one resource to perform sending, so as to achieve a purpose of increasing transmit power on the one resource, so that the user equipment can accurately communicate with the base station. The power boosting technology means, for example, that the base station originally sends signals to user equipment A and user equipment B at the same time, but currently, the base station does not send a signal to the user equipment B, and superimposes power of the signal originally sent to the user equipment on power of a signal sent to the user equipment A, so as to increase the transmit power of the signal sent to user equipment A, so that the user equipment can accurately communicate with the base station. It should be noted that the coverage enhancement technology in this embodiment is not limited to the described several technologies, or may be another technology that can be used by persons skilled in the art.

That is, for same user equipment, the user equipment accurately communicates with the base station according to a difference of environments in which the user equipment is located and according to signal repetition times corresponding to coverage enhancement requirements in the environments. For different user equipments, the user equipments accurately communicate with the base station according to signal repetition times corresponding to coverage enhancement requirements of the user equipments.

In a specific implementation process, to ensure accuracy of communication between the user equipment and the base station, if different coverage enhancement compensations need to be obtained for two coverage enhancement requirements of different levels by using the signal repetition technology, signal repetition times corresponding to the coverage enhancement requirements of different levels also need to be different. Therefore, when a coverage enhancement requirement is at a first level, signal repetition times corresponding to the coverage enhancement requirement is a first value, for example, may be 6; when the coverage enhancement requirement is at a second level higher than the first level, the signal repetition times corresponding to the second coverage enhancement requirement is a second value greater than the first value, for example, may be 7; and when the coverage enhancement requirement is at a third level lower than the first level, the signal repetition times corresponding to the coverage enhancement requirement is a third value less than the first value, for example, may be 5.

It can be seen that because the following technical solution is used: when a coverage enhancement requirement is at a first level, signal repetition times corresponding to the coverage enhancement requirement is a first value; when a coverage enhancement requirement is at a second level higher than the first level, signal repetition times corresponding to the second coverage enhancement requirement is a second value greater than the first value; and when a coverage enhancement requirement is at a third level lower than the first level, signal repetition times corresponding to the coverage enhancement requirement is a third value less than the first value, it is avoided that signal repetition times corresponding to two coverage enhancement requirements of different levels are the same, thereby ensuring accuracy of communication between the user equipment and the base station.

In a specific implementation process, when the coverage enhancement requirement is at a specified level, and a status of communication between the user equipment and the base station is quite good, the signal repetition technology is not required to ensure accurate communication between the user equipment and the base station. Therefore, signal repetition times corresponding to the coverage enhancement requirement of the specified level may be set to 0, and details are not described herein again.

Certainly, when the coverage enhancement requirement is at a specified level, and a status of communication between the user equipment and the base station is not quite good, the coverage enhancement technology needs to be used to ensure accurate communication between the user equipment and the base station. However, the user equipment needs to communicate with the base station only by using another technology, in the coverage enhancement technology described above, except the signal repetition technology, without using the signal repetition technology, and details are not described herein again. It should be noted that, the specified level described herein may be the same as or different from the specified level, of the coverage enhancement requirement corresponding to the signal repetition times 0, in the foregoing part.

It can be seen from the foregoing part, that because the following technical solution is used: user equipment obtains a coverage enhancement requirement and communicates with a base station according to the coverage enhancement requirement, in a case of ensuring that the user equipment accurately communicates with the base station, the user equipment accurately communicates with the base station according to the obtained coverage enhancement requirement, which avoids a case in which the base station still adds, when communicating with user equipment whose communication status is better, a same quantity of communication resources added when communicating with user equipment whose communication status is poorer, thereby resolving a technical problem in the prior art that a waste of resources exists when a base station communicates with user equipment, and implementing a technical effect of reducing a waste of resources.

In a specific implementation process, in order that the user equipment can quickly and accurately obtain the coverage enhancement requirement of the user equipment in a next random access process to ensure accurate communication with the base station, after the user equipment communicates with the base station according to the coverage enhancement requirement, the information processing method provided in this embodiment further includes: the user equipment stores the coverage enhancement requirement, so that the user equipment uses the coverage enhancement requirement in a next random access process. It should be noted that the coverage enhancement requirement herein may be a first coverage enhancement requirement, or may be a second coverage enhancement requirement, which is not limited herein.

For example, after accurately communicating with the base station according to the obtained coverage enhancement requirement, the user equipment stores the coverage enhancement requirement, so that the user equipment directly uses the coverage enhancement requirement when initiating a random access process next time. For example, when initiating a random access process, the user equipment reports a random access preamble sequence by using the stored coverage enhancement requirement, so as to ensure that the user equipment accurately communicates with the base station.

Figure 7A:
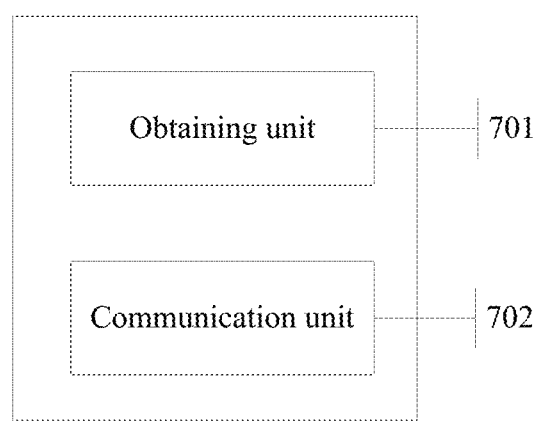
FIG. 7A is a diagram of functional modules of user equipment according to an embodiment.

Based on a similar idea, one aspect of this embodiment further provides user equipment. Referring to FIG. 7A, FIG. 7A is a diagram of functional modules of user equipment according to an embodiment. As shown in FIG. 7A, the user equipment includes: an obtaining unit 701, configured to obtain a coverage enhancement requirement; and a communication unit 702, configured to communicate with a base station according to the coverage enhancement requirement.

In a specific implementation process, the user equipment further includes a storage unit, where the storage unit is configured to: after the obtaining unit obtains the coverage enhancement requirement, store the coverage enhancement requirement, so that the user equipment uses the coverage enhancement requirement in a next random access process.

In a specific implementation process, the communication unit 702 is further configured to: after the obtaining unit 701 obtains the coverage enhancement requirement, report the coverage enhancement requirement to the base station, so that the base station determines the coverage enhancement requirement of the user equipment.

In a specific implementation process, the communication unit 702 is specifically configured to: report, at a first moment, a first coverage enhancement requirement to the base station in a random access process, where the first coverage enhancement requirement has first precision; and report a first message to the base station at a second moment after the first moment, where the first message is used to instruct the base station to adjust, based on the first message, the first coverage enhancement requirement to a second coverage enhancement requirement, the second coverage enhancement requirement has second precision, and the second precision is higher than the first precision.

In a specific implementation process, the user equipment further includes a storage unit, configured to store the second coverage enhancement requirement, so that the user equipment uses the second coverage enhancement requirement in a next random access process.

In a specific implementation process, the obtaining unit 701 is specifically configured to receive a coverage enhancement requirement indication message delivered by the base station, and obtain the coverage enhancement requirement according to the coverage enhancement requirement indication message.

In a specific implementation process, the communication unit 702 is further configured to: before the obtaining unit 701 receives the coverage enhancement requirement indication message delivered by the base station, report a message to the base station, so that the base station generates the coverage enhancement requirement indication message according to the message reported by the user equipment.

In a specific implementation process, the communication unit 702 is specifically configured to report a first coverage enhancement requirement to the base station at a first moment by using a random access preamble sequence, where the first coverage enhancement requirement has first precision, so that the base station generates the coverage enhancement requirement indication message at a second moment after the first moment according to a message reported by the user equipment at a moment between the first moment and the second moment, where the coverage enhancement requirement indication message is used to instruct the user equipment to adjust the first coverage enhancement requirement to a second coverage enhancement requirement, the second coverage enhancement requirement has second precision, and the second precision is higher than the first precision.

In a specific implementation process, the obtaining unit 701 is specifically configured to receive the coverage enhancement requirement indication message delivered by the base station by using a random access response message.

In a specific implementation process, the user equipment further includes a storage unit, configured to: after the obtaining unit 701 obtains the coverage enhancement requirement according to the coverage enhancement requirement indication message, store the coverage enhancement requirement, so that the user equipment uses the coverage enhancement requirement in a next random access process.

In a specific implementation process, the communication unit 702 is specifically configured to communicate with the base station according to signal repetition times corresponding to the coverage enhancement requirement.

In a specific implementation process, when the coverage enhancement requirement is at a first level, the signal repetition times corresponding to the coverage enhancement requirement is a first value; when the coverage enhancement requirement is at a second level higher than the first level, the signal repetition times corresponding to the second coverage enhancement requirement is a second value greater than the first value; and when the coverage enhancement requirement is at a third level lower than the first level, the signal repetition times corresponding to the coverage enhancement requirement is a third value less than the first value.

In a specific implementation process, when the coverage enhancement requirement is at a specified level, the signal repetition times corresponding to the coverage enhancement requirement is 0.

In a specific implementation process, a coverage enhancement technology includes a requirement relaxing technology, a signal repetition technology, power spectrum density boosting, and power boosting; and when the coverage requirement is at a specified level, the communication unit 702 is specifically configured to communicate, according to the coverage enhancement requirement, with the base station by using another technology, in the coverage enhancement technology, except the signal repetition technology.

Figure 7B:
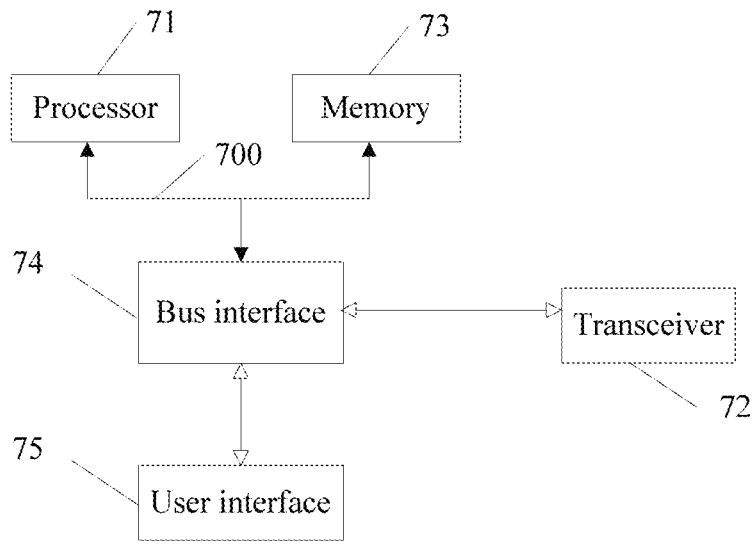
FIG. 7B is a concept diagram of hardware implementation of user equipment according to an embodiment.

Further, referring to FIG. 7B, FIG. 7B is a concept diagram of hardware implementation of user equipment according to an embodiment. As shown in FIG. 7B, the user equipment includes: a processor 71, configured to obtain a coverage enhancement requirement; and a transceiver 72, configured to communicate with a base station according to the coverage enhancement requirement.

In a specific implementation process, the user equipment further includes a memory 73, where the memory 73 is configured to: after the processor 71 obtains the coverage enhancement requirement, store the coverage enhancement requirement, so that the user equipment uses the coverage enhancement requirement in a next random access process.

Still referring to FIG. 7B, there is a bus architecture (represented by a bus 700). The bus 700 may include any quantity of interconnected buses and bridges, and the bus 700 links various types of circuits that include one or more processors represented by the processor 71 and a memory represented by the memory 73 together. The bus 700 may further link various other types of circuits such as a peripheral device, a voltage stabilizer, and a power management circuit together. These various other types of circuits are publicly known in the art, and therefore are not further described in this specification. A bus interface 74 provides an interface between the bus 700 and the transceiver 72, so as to provide a unit configured to communicate with various other apparatuses or devices on a transmission medium, where the transceiver 72 may be a same component or apparatus, or may be jointly composed of a receiver and a transmitter, which is not limited herein. The user equipment may further provide a user interface 75, such as a keypad, a display, a loudspeaker, a microphone, and a joystick according to a property of the user equipment.

In a specific implementation process, the transceiver 72 is further configured to: after the processor 71 obtains the coverage enhancement requirement, report the coverage enhancement requirement to the base station, so that the base station determines the coverage enhancement requirement of the information processing user equipment.

In a specific implementation process, the transceiver 72 is specifically configured to: report, at a first moment, a first coverage enhancement requirement to the base station in a random access process, where the first coverage enhancement requirement has first precision; and report a first message to the base station at a second moment after the first moment, where the first message is used to instruct the base station to adjust, based on the first message, the first coverage enhancement requirement to a second coverage enhancement requirement, the second coverage enhancement requirement has second precision, and the second precision is higher than the first precision.

In a specific implementation process, the user equipment further includes a memory 73, where the memory 73 is configured to store the second coverage enhancement requirement, so that the user equipment uses the second coverage enhancement requirement in a next random access process.

In a specific implementation process, the processor 71 is specifically configured to receive a coverage enhancement requirement indication message delivered by the base station, and obtain the coverage enhancement requirement according to the coverage enhancement requirement indication message.

In a specific implementation process, the transceiver 72 is further configured to: before the processor 71 receives the coverage enhancement requirement indication message delivered by the base station, report a message to the base station, so that the base station generates the coverage enhancement requirement indication message according to the message reported by the user equipment.

In a specific implementation process, the transceiver 72 is specifically configured to report a first coverage enhancement requirement to the base station at a first moment by using a random access preamble sequence, where the first coverage enhancement requirement has first precision, so that the base station generates the coverage enhancement requirement indication message at a second moment after the first moment according to a message reported by the user equipment at a moment between the first moment and the second moment, where the coverage enhancement requirement indication message is used to instruct the user equipment to adjust the first coverage enhancement requirement to a second coverage enhancement requirement, the second coverage enhancement requirement has second precision, and the second precision is higher than the first precision.

In a specific implementation process, the processor 71 is specifically configured to receive the coverage enhancement requirement indication message delivered by the base station by using a random access response message.

In a specific implementation process, the user equipment further includes a memory 73, where the memory 73 is configured to: after the processor 71 obtains the coverage enhancement requirement according to the coverage enhancement requirement indication message, store the coverage enhancement requirement, so that the user equipment uses the coverage enhancement requirement in a next random access process.

In a specific implementation process, the transceiver 72 is specifically configured to communicate with the base station according to signal repetition times corresponding to the coverage enhancement requirement.

In a specific implementation process, when the coverage enhancement requirement is at a first level, the signal repetition times corresponding to the coverage enhancement requirement is a first value; when the coverage enhancement requirement is at a second level higher than the first level, the signal repetition times corresponding to the second coverage enhancement requirement is a second value greater than the first value; and when the coverage enhancement requirement is at a third level lower than the first level, the signal repetition times corresponding to the coverage enhancement requirement is a third value less than the first value.

In a specific implementation process, when the coverage enhancement requirement is at a specified level, the signal repetition times corresponding to the coverage enhancement requirement is 0.

In a specific implementation process, a coverage enhancement technology includes a requirement relaxing technology, a signal repetition technology, power spectrum density boosting, and power boosting; and when the coverage requirement is at a specified level, the transceiver 72 is specifically configured to communicate, according to the coverage enhancement requirement, with the base station by using another technology, in the coverage enhancement technology, except the signal repetition technology.

The user equipment in this embodiment and the information processing method in the foregoing part are two aspects based on a similar idea, the implementation process of the method is described in detail in the foregoing part, and therefore, persons skilled in the prior art may clearly understand a structure and an implementation process of the user equipment in this embodiment according to the foregoing description. For brief of this specification, details are not described herein again.

Embodiment 1 describes the technical solution of the on a user equipment side, and Embodiment 2 in the following describes the technical solution of the embodiment on a base station side.

Embodiment 2

Figure 8:
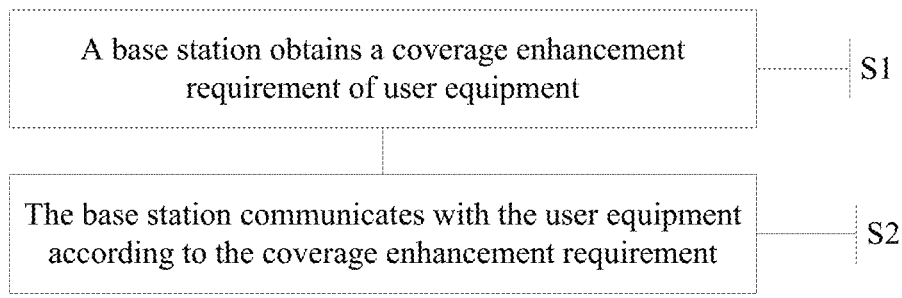
FIG. 8 is a flowchart of an information processing method on a base station side according to an embodiment.

Referring to FIG. 8, this embodiment further provides an information processing method. As shown in FIG. 8, the information processing method includes the following.

S1: A base station obtains a coverage enhancement requirement of user equipment.

S2: The base station communicates with the user equipment according to the coverage enhancement requirement.

In step S1, the base station may obtain the coverage enhancement requirement of the user equipment in two manners, which are separately described in the following part.

Manner 1.

The base station receives, at a first moment, a first coverage enhancement requirement reported by the user equipment to the base station in a random access process, where the first coverage enhancement requirement has first precision; and the base station receives, at a second moment after the first moment, a first message reported by the user equipment, and adjusts the first coverage enhancement requirement to a second coverage enhancement requirement according to the first message, where the second coverage enhancement requirement has second precision, and the second precision is higher than the first precision. A specific process of Manner 1 is described in detail in Embodiment 1, and therefore, for the specific process of Manner 1, reference is made to the corresponding part in Embodiment 1, and details are not described herein again.

Manner 2: The base station obtains the coverage enhancement requirement of the user equipment according to a message reported by the user equipment.

Specifically, Manner 2 may include: the base station receives, at a first moment, a first coverage enhancement requirement reported by the user equipment by using a random access preamble sequence, where the first coverage enhancement requirement has first precision; and at a second moment after the first moment according to a message reported by the user equipment at a moment between the first moment and the second moment, the base station obtains a second coverage enhancement requirement of the user equipment, and generates a coverage enhancement requirement indication message, where the coverage enhancement requirement indication message is used to instruct the user equipment to adjust the first coverage enhancement requirement to the second coverage enhancement requirement, the second coverage enhancement requirement has second precision, and the second precision is higher than the first precision.

A specific process of Manner 2 is described in detail in Embodiment 1, and therefore, for the specific process of Manner 2, reference is made to the corresponding part in Embodiment 1, and details are not described herein again.

In a specific implementation process, in order that the user equipment can determine the coverage enhancement requirement obtained by the base station, after the base station generates the coverage enhancement requirement indication message according to the message reported by the user equipment at the moment between the first moment and the second moment, the method provided in this embodiment may further include: the base station delivers the coverage enhancement requirement indication message to the user equipment.

In a specific implementation process, the base station delivers the coverage enhancement requirement indication message to the user equipment by using a random access response message.

A specific process of delivering the coverage enhancement requirement indication message to the user equipment by the base station by using the random access response message is described in detail in Embodiment 1, and details are not described herein again.

In a specific implementation process, after the base station obtains the coverage enhancement requirement of the user equipment and delivers the coverage enhancement requirement to the user equipment by using the coverage enhancement requirement indication message, if the coverage enhancement requirement indicates that a coverage enhancement technology used by the user equipment is a signal repetition technology, the base station may communicate with the user equipment according to signal repetition times corresponding to the coverage enhancement requirement, and details are not described herein again.

In a specific implementation process, when the coverage enhancement requirement is at a first level, the signal repetition times corresponding to the coverage enhancement requirement is a first value; when the coverage enhancement requirement is at a second level higher than the first level, the signal repetition times corresponding to the second coverage enhancement requirement is a second value greater than the first value; and when the coverage enhancement requirement is at a third level lower than the first level, the signal repetition times corresponding to the coverage enhancement requirement is a third value less than the first value.

In a specific implementation process, when the coverage enhancement requirement is at a specified level, the signal repetition times corresponding to the coverage enhancement requirement is 0.

In a specific implementation process, the coverage enhancement technology includes a requirement relaxing technology, a signal repetition technology, power spectrum density boosting, and power boosting.

When the coverage requirement is at a specified level, the base station communicates with the user equipment according to the coverage enhancement requirement is specifically: the base station communicates, according to the coverage enhancement requirement, with the user equipment by using another technology, in the coverage enhancement technology, except the signal repetition technology.

Figure 9A:
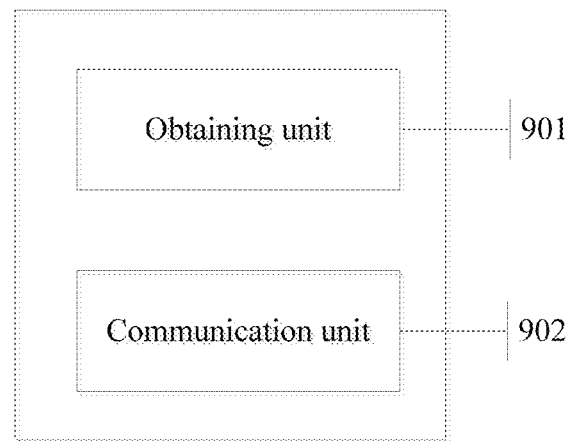
FIG. 9A is a diagram of functional modules of a base station according to an embodiment.

Based on a similar idea, one aspect of this embodiment further provides a base station. Referring to FIG. 9A, FIG. 9A is a diagram of functional modules of a base station according to an embodiment. As shown in FIG. 9A, the base station includes: an obtaining unit 901, configured to obtain a coverage enhancement requirement of user equipment; and a communication unit 902, configured to communicate with the user equipment according to the coverage enhancement requirement.

In a specific implementation process, the obtaining unit 901 is specifically configured to: receive, at a first moment, a first coverage enhancement requirement reported by the user equipment to the base station in a random access process, where the first coverage enhancement requirement has first precision; and receive, at a second moment, a first message reported by the user equipment, and adjust the first coverage enhancement requirement to a second coverage enhancement requirement according to the first message, where the second coverage enhancement requirement has second precision, and the second precision is higher than the first precision.

In a specific implementation process, the obtaining unit 901 is specifically configured to obtain the coverage enhancement requirement of the user equipment according to a message reported by the user equipment.

In a specific implementation process, the obtaining unit 901 is specifically configured to: receive, at a first moment, a first coverage enhancement requirement reported by the user equipment by using a random access preamble sequence, where the first coverage enhancement requirement has first precision; and at a second moment after the first moment according to a message reported by the user equipment at a moment between the first moment and the second moment, obtain a second coverage enhancement requirement of the user equipment, and generate a coverage enhancement requirement indication message, where the coverage enhancement requirement indication message is used to instruct the user equipment to adjust the first coverage enhancement requirement to the second coverage enhancement requirement, the second coverage enhancement requirement has second precision, and the second precision is higher than the first precision.

In a specific implementation process, the communication unit 902 is further configured to: after the obtaining unit 901 generates the coverage enhancement requirement indication message according to the message reported by the user equipment at the moment between the first moment and the second moment, deliver the coverage enhancement requirement indication message to the user equipment.

In a specific implementation process, the communication unit 902 is specifically configured to deliver the coverage enhancement requirement indication message to the user equipment by using a random access response message.

In a specific implementation process, the communication unit 902 is specifically configured to communicate with the user equipment according to signal repetition times corresponding to the coverage enhancement requirement.

In a specific implementation process, when the coverage enhancement requirement is at a first level, the signal repetition times corresponding to the coverage enhancement requirement is a first value; when the coverage enhancement requirement is at a second level higher than the first level, the signal repetition times corresponding to the second coverage enhancement requirement is a second value greater than the first value; and when the coverage enhancement requirement is at a third level lower than the first level, the signal repetition times corresponding to the coverage enhancement requirement is a third value less than the first value.

In a specific implementation process, when the coverage enhancement requirement is at a specified level, the signal repetition times corresponding to the coverage enhancement requirement is 0.

In a specific implementation process, a coverage enhancement technology includes a requirement relaxing technology, a signal repetition technology, power spectrum density boosting, and power boosting; and when the coverage requirement is at a specified level, the communication unit 902 is specifically configured to communicate, according to the coverage enhancement requirement, with the user equipment by using another technology, in the coverage enhancement technology, except the signal repetition technology.

Figure 9B:
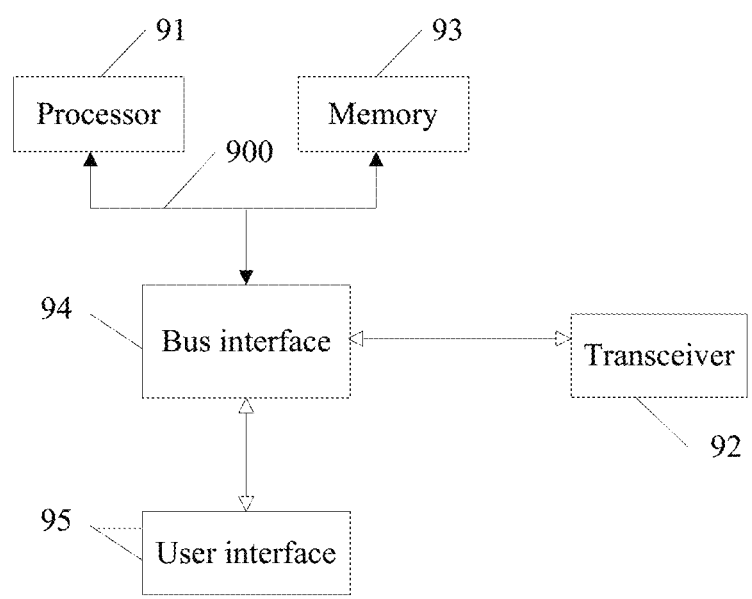
FIG. 9B is a concept diagram of hardware implementation of a base station according to an embodiment.

Still referring to FIG. 9B, FIG. 9B is a concept diagram of hardware implementation of a base station according to an embodiment. As shown in FIG. 9B, the base station includes: a processor 91, configured to obtain a coverage enhancement requirement of user equipment; and a transceiver 92, configured to communicate with the user equipment according to the coverage enhancement requirement.

Still referring to FIG. 9B, there is a bus architecture (represented by a bus 900). The bus 900 may include any quantity of interconnected buses and bridges, and the bus 900 links various types of circuits that include one or more processors represented by the processor 91 and a memory represented by a memory 93 together, where the memory 93 may be configured to store data used when the processor 91 performs an operation. The bus 900 may further link various other types of circuits such as a peripheral device, a voltage stabilizer, and a power management circuit together. These various other types of circuits are publicly known in the art, and therefore are not further described in this specification. A bus interface 94 provides an interface between the bus 900 and the transceiver 92, so as to provide a unit configured to communicate with various other apparatuses or devices on a transmission medium, where the transceiver 92 may be a same component or apparatus, or may be jointly composed of a receiver and a transmitter, which is not limited herein. The user equipment may further provide a user interface 95, such as a keypad, a display, a loudspeaker, a microphone, and a joystick according to a property of the user equipment.

In a specific implementation process, the processor 91 is specifically configured to: receive, at a first moment, a first coverage enhancement requirement reported by the user equipment to the base station in a random access process, where the first coverage enhancement requirement has first precision; and receive, at a second moment, a first message reported by the user equipment, and adjust the first coverage enhancement requirement to a second coverage enhancement requirement according to the first message, where the second coverage enhancement requirement has second precision, and the second precision is higher than the first precision.

In a specific implementation process, the processor 91 is specifically configured to obtain the coverage enhancement requirement of the user equipment according to a message reported by the user equipment.

In a specific implementation process, the processor 91 is specifically configured to: receive, at a first moment, a first coverage enhancement requirement reported by the user equipment by using a random access preamble sequence, where the first coverage enhancement requirement has first precision; and at a second moment after the first moment according to a message reported by the user equipment at a moment between the first moment and the second moment, obtain a second coverage enhancement requirement of the user equipment, and generate a coverage enhancement requirement indication message, where the coverage enhancement requirement indication message is used to instruct the user equipment to adjust the first coverage enhancement requirement to the second coverage enhancement requirement, the second coverage enhancement requirement has second precision, and the second precision is higher than the first precision.

In a specific implementation process, the transceiver 92 is further configured to: after the processor 91 generates the coverage enhancement requirement indication message according to the message reported by the user equipment at the moment between the first moment and the second moment, deliver the coverage enhancement requirement indication message to the user equipment.

In a specific implementation process, the transceiver 92 is specifically configured to deliver the coverage enhancement requirement indication message to the user equipment by using a random access response message.

In a specific implementation process, the transceiver 92 is specifically configured to communicate with the user equipment according to signal repetition times corresponding to the coverage enhancement requirement.

In a specific implementation process, when the coverage enhancement requirement is at a first level, the signal repetition times corresponding to the coverage enhancement requirement is a first value; when the coverage enhancement requirement is at a second level higher than the first level, the signal repetition times corresponding to the second coverage enhancement requirement is a second value greater than the first value; and when the coverage enhancement requirement is at a third level lower than the first level, the signal repetition times corresponding to the coverage enhancement requirement is a third value less than the first value.

In a specific implementation process, when the coverage enhancement requirement is at a specified level, the signal repetition times corresponding to the coverage enhancement requirement is 0.

In a specific implementation process, a coverage enhancement technology includes a requirement relaxing technology, a signal repetition technology, power spectrum density boosting, and power boosting; and when the coverage requirement is at a specified level, the transceiver 92 is specifically configured to communicate, according to the coverage enhancement requirement, with the user equipment by using another technology, in the coverage enhancement technology, except the signal repetition technology.

The base station in this embodiment and the information processing method in the foregoing part are two aspects based on a similar idea, the implementation process of the method is described in detail in the foregoing part, and therefore, persons skilled in the prior art may clearly understand a structure and an implementation process of the information processing apparatus in this embodiment according to the foregoing description. For brief of this specification, details are not described herein again.

One or more embodiments may implement the following technical effects:

1. Because the following technical solution is used: user equipment obtains a coverage enhancement requirement and communicates with a base station according to the coverage enhancement requirement, in a case of ensuring that the user equipment accurately communicates with the base station, the user equipment accurately communicates with the base station according to the obtained coverage enhancement requirement, which avoids a case in which the base station still adds, when communicating with user equipment whose communication status is better, a same quantity of communication resources added when communicating with user equipment whose communication status is poorer, thereby resolving a technical problem in the prior art that a waste of resources exists when a base station communicates with user equipment, and implementing a technical effect of reducing a waste of resources.

2. After the user equipment reports a second coverage enhancement requirement to the base station, the base station can determine that a coverage enhancement requirement of the user equipment is the second coverage enhancement requirement whose precision is higher than first precision of a first coverage enhancement requirement, and communicate with the user equipment according to the second coverage enhancement requirement, thereby further reducing a waste of resources.

3. Because the following technical solution is used: the coverage enhancement requirement used by the user equipment in communication with the base station is stored, so that the user equipment uses the coverage enhancement requirement in a next random access process, the user equipment can quickly and accurately obtain the coverage enhancement requirement of the user equipment in the next random access process, thereby further reducing a waste of resources.

4. Because the following technical solution is used: when the coverage enhancement requirement is at a first level, signal repetition times corresponding to the coverage enhancement requirement is a first value; when the coverage enhancement requirement is at a second level higher than the first level, signal repetition times corresponding to the second coverage enhancement requirement is a second value greater than the first value; and when the coverage enhancement requirement is at a third level lower than the first level, the signal repetition times corresponding to the coverage enhancement requirement is a third value less than the first value, it is avoided that signal repetition times corresponding to two coverage enhancement requirements of different levels are the same, thereby ensuring accuracy of communication between the user equipment and the base station.

Persons skilled in the art should understand that the embodiments may be provided as a method, a system, or a computer program product. Therefore, embodiments may use a form of hardware only embodiments, software only embodiments, or embodiments with a combination of software and hardware. Moreover, embodiments may use a form of a computer program product that is implemented on one or more computer-usable storage media (including but not limited to a disk memory, a compact disc read-only memory (CD-ROM), an optical memory, and the like) that include computer-usable program code.

The present embodiments are described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments have been described, persons skilled in the art can make changes and modifications to these embodiments once they learn the basic inventive concept. Therefore, the following claims are intended to be construed as to cover the embodiments and all changes and modifications falling within the scope.

Obviously, persons skilled in the art can make various modifications and variations to the embodiments without departing from the spirit and scope of the embodiments. The embodiments are intended to cover these modifications and variations provided that they fall within the scope of protection defined by the following claims and their equivalent technologies.

What is claimed is:

1. A method comprising:
reporting, by a user equipment, a first coverage enhancement requirement to a base station at a first moment using a random access preamble sequence, wherein the first coverage enhancement requirement has a first precision;
reporting, by the user equipment, at a third moment between the first moment and a second moment, a message to the base station, and subsequently receiving a coverage enhancement requirement indication message from the base station at the second moment after the first moment, wherein the coverage enhancement requirement indication message is generated according to the message reported by the user equipment, and wherein the coverage enhancement requirement indication message instructs the user equipment to adjust the first coverage enhancement requirement to a second coverage enhancement requirement, wherein the second coverage enhancement requirement has a second precision, and the second precision is higher than the first precision; and
communicating, by the user equipment, with the base station, according to the second coverage enhancement requirement;
wherein the first coverage enhancement requirement and the second coverage enhancement requirement each correspond to a level of support that enables the user equipment to get access to a network.

2. The method according to claim 1, wherein communicating, by the user equipment, with the base station, according to the second coverage enhancement requirement comprises:
communicating, by the user equipment, with the base station, according to signal repetition times corresponding to the second coverage enhancement requirement.

3. The method according to claim 1, wherein the level of support indicates a minimum level of support provided by the base station.

4. The method according to claim 1, wherein the first coverage enhancement requirement indicates a coverage enhancement level.

5. The method according to claim 1, wherein the first coverage enhancement requirement indicates a number of signal repetitions.

6. The method according to claim 1, wherein the message includes an uplink reference message.

7. A method comprising:
receiving, by a base station at a first moment, a first coverage enhancement requirement reported by a user equipment using a random access preamble sequence, wherein the first coverage enhancement requirement has a first precision;
receiving, by the base station, a message reported by the user equipment at a third moment after the first moment, and adjusting the first coverage enhancement requirement to a second coverage enhancement requirement according to the message, wherein the second coverage enhancement requirement has a second precision, and the second precision is higher than the first precision;
delivering, by the base station, a coverage enhancement requirement indication message to the user equipment at a second moment, wherein the coverage enhancement requirement indication message is generated according to the message reported by the user equipment, and wherein the coverage enhancement requirement indication message instructs the user equipment to adjust the first coverage enhancement requirement to the second coverage enhancement requirement; and
communicating, by the base station, with the user equipment, according to the second coverage enhancement requirement;
wherein the first coverage enhancement requirement and the second coverage enhancement requirement each correspond to a level of support that enables the user equipment to get access to a network.

8. The method according to claim 7, wherein communicating, by the base station, with the user equipment, according to the second coverage enhancement requirement comprises:
communicating, by the base station, with the user equipment, according to signal repetition times corresponding to the second coverage enhancement requirement.

9. The method according to claim 7, wherein the level of support indicates a minimum level of support provided by the base station.

10. The method according to claim 7, wherein the first coverage enhancement requirement indicates a coverage enhancement level.

11. The method according to claim 7, wherein the first coverage enhancement requirement indicates number of signal repetitions.

12. The method according to claim 7, wherein the message includes an uplink reference message.

13. A user equipment, comprising:
a processor;
a non-transitory computer readable storage medium storing a program for execution by the processor, the program including instructions to:
report a first coverage enhancement requirement to a base station at a first moment using a random access preamble sequence, wherein the first coverage enhancement requirement has a first precision;
report at a third moment between the first moment and a second moment, a message to the base station, and subsequently receive a coverage enhancement requirement indication message from the base station at the second moment after the first moment, wherein the coverage enhancement requirement indication message is generated according to the message reported by the user equipment, and the coverage enhancement requirement indication message instructs the user equipment to adjust the first coverage enhancement requirement to a second coverage enhancement requirement, wherein the second coverage enhancement requirement has a second precision, and the second precision is higher than the first precision; and
communicate, with the base station, according to the second coverage enhancement requirement;
wherein the first coverage enhancement requirement and the second coverage enhancement requirement each correspond to a level of support that enables the user equipment to get access to a network.

14. The user equipment according to claim 13, wherein the instructions to communicate with the base station, according to the second coverage enhancement requirement, comprise: instructions to communicate with the base station according to signal repetition times corresponding to the second coverage enhancement requirement.

15. The user equipment according to claim 13, wherein the level of support indicates a minimum level of support provided by the base station.

16. The user equipment according to claim 13, wherein the first coverage enhancement requirement indicates a coverage enhancement level.

17. A base station, comprising:
a processor;
a non-transitory computer readable storage medium storing a program for execution by the processor, the program including instructions to:
receive at a first moment, a first coverage enhancement requirement reported by a user equipment using a random access preamble sequence, wherein the first coverage enhancement requirement has a first precision;
receive a message reported by the user equipment at a third moment after the first moment, and adjust the first coverage enhancement requirement to a second coverage enhancement requirement according to the message, wherein the second coverage enhancement requirement has a second precision, and the second precision is higher than the first precision; and
deliver a coverage enhancement requirement indication message to the user equipment at a second moment, wherein the coverage enhancement requirement indication message is generated according to the message reported by the user equipment, and the coverage enhancement requirement indication message instructs the user equipment to adjust the first coverage enhancement requirement to the second coverage enhancement requirement;
communicate with the user equipment according to the second coverage enhancement requirement;
wherein the first coverage enhancement requirement and the second coverage enhancement requirement each correspond to a level of support that enables the user equipment to get access to a network.

18. The base station according to claim 17, wherein the instructions to communicate with the user equipment, according to the second coverage enhancement requirement comprise: instructions to communicate with the user equipment according to signal repetition times corresponding to the second coverage enhancement requirement.

\* \* \* \* \*